United States Patent
Zhu et al.

(10) Patent No.: US 7,870,083 B2
(45) Date of Patent: Jan. 11, 2011

(54) SYSTEMS AND METHODS FOR GENERATING PREDICTIVE MATRIX-VARIATE T MODELS

(75) Inventors: Shenghuo Zhu, Santa Clara, CA (US); Kai Yu, Cupertino, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 648 days.

(21) Appl. No.: 11/869,886

(22) Filed: Oct. 10, 2007

(65) Prior Publication Data

US 2009/0099984 A1 Apr. 16, 2009

(51) Int. Cl.
*G06F 15/18* (2006.01)
*G06F 15/00* (2006.01)

(52) U.S. Cl. .............................. 706/12; 705/10; 702/85
(58) Field of Classification Search .................. 705/10; 702/85
See application file for complete search history.

(56) References Cited

U.S. PATENT DOCUMENTS

2009/0018891 A1* 1/2009 Eder ............................ 705/10
2009/0055139 A1* 2/2009 Agarwal et al. ................. 703/2

OTHER PUBLICATIONS

C. Archambeau, N. Delannay, and M. Verleysen. Robust probabilistic projections. In ICML, 2006.

J. Breese, D. Heckerman, and C. Kadie. Empirical analysis of predictive algorithms for collaborative filtering. In UAI-98, pp. 43-52, 1998.

M. Fazel, H. Haitham, and S. P. Boyd. Log-det heuristic for matrix rank minimization with applications to Hankel and Euclidean distance matrices. In Proceedings of the American Control Conference, 2003.

C. Fernandez and M. F. J. Steel. Multivariate Student-t regression models: Pitfalls and inference. Biometrika, 86(1):153-167, 1999.

A. K. Gupta and D. K. Nagar. Matrix Variate Distributions. Chapman & Hall/CRC, 2000.

N. Lawrence. Probabilistic non-linear principal component analysis with Gaussian process latent variable models. J. Mach. Learn. Res., 6:1783-1816, 2005.

D. J. C. MacKay. Comparison of approximate methods for handling hyper-parameters. Neural Comput., 11(5):1035-1068, 1999.

J. D. M. Rennie and N. Srebro. Fast maximum margin matric factorization for collaborative prediction, In ICML, 2005.

M. E. Tipping. Sparse Bayesian learning and the relevance vector machine. Journal of Machine Learning Research, 1:211-244, 2001.

M. E. Tipping and C. M. Bishop. Probablilistic principal component analysis. Journal of the Royal Statistical Society, B(61):611-622, 1999.

(Continued)

*Primary Examiner*—Michael B. Holmes
*Assistant Examiner*—Kalpana Bharadwaj
(74) *Attorney, Agent, or Firm*—Bao Tran; Joseph Kolodka

(57) ABSTRACT

Systems and methods are disclosed to predict one or more missing elements from a partially-observed matrix by receiving one or more user item ratings; generating a model parameterized by matrices U, S, V; applying the model to display an item based on one or more predicted missing elements; and applying the model at run-time and determining $U_i^T S V_j$.

18 Claims, 5 Drawing Sheets

OTHER PUBLICATIONS

K. Yu, W. Chu, S. Yu, V. Tresp, and Z. Xu. Stochastic relational models for descriminative link prediction, In Advances in Neural Information Processing Systems 19 (NIPS), 2006.

K. Yu, V. Tresp, and A. Schwaighofer. Learning Gaussian processes from multiple tasks. In ICML, 2005.

* cited by examiner

SYSTEMS AND METHODS FOR GENERATING PREDICTIVE MATRIX-VARIATE T MODELS

BACKGROUND

Matrix analysis techniques, e.g., singular value decomposition (SVD), have been widely used in various data analysis applications. An important class of applications is to predict missing elements given a partially observed random matrix. For example, putting ratings of users into a matrix form, the goal of collaborative filtering is to predict those unseen ratings in the matrix.

Various probabilistic models have been used to analyze the matrices. Let Y be a p×m observational matrix and T be the underlying p×m noise-free random matrix. The system assumes that $Y_{i,j}=T_{i,j}+\epsilon_{i,j}, \epsilon_{i,j} \sim N(0,\sigma^2)$, where $Y_{i,j}$ denotes the (i,j)-th element of Y. If Y is partially observed, then $Y_{\|}$ denotes the set of observed elements and $\|$ is the corresponding index set.

One model called the Probabilistic Principal Component Analysis (PPCA) assumes that $y_j$, the j-th column vector of Y, can be generated from a latent vector $v_j$ in a k-dimensional linear space (k<p). The model is defined as $$y_j = Wv_j + \mu + \epsilon_j, \; v_j \sim N_k(v_j; 0, I_k),$$

where $\epsilon_j \sim N_p(\epsilon_j; 0, \sigma^2 I_p)$, and W is a p×k loading matrix. By integrating out $v_j$, the system obtains the marginal distribution $y_j \sim N_p(y_j; \mu, WW^T + \sigma^2 I_p)$. Since the columns of Y are conditionally independent, PPCA is equivalent to $$Y_{i,j} = T_{i,j} + \epsilon_{i,j}, \; T \sim N_{p,m}(T; 0, S, I_m),$$

where $S=WW^T$, and $N_{p,m}(\bullet; 0, S, I_m)$ is a matrix-variate normal prior with zero mean, covariance S between rows, and identity covariance $I_m$ between columns. PPCA aims to estimate the parameter W in order to obtain the covariance matrix S. There is no further prior on W.

Another model called the Gaussian Process Latent-Variable Model (GPLVM) formulates a latent-variable model in a slightly unconventional way. It considers the same linear relationship from latent representation $v_j$ to observations $y_j$. Instead of treating $v_j$ as random variables, GPLVM assigns a prior on W and see $\{v_j\}$ as parameters $$y_j = Wv_j + \epsilon_j, \; W \sim N_{p,k}(W; 0, I_p, I_k),$$

where the elements of W are independent Gaussian random variables. By marginalizing out W, the system obtains a distribution that each row of Y is an i.i.d. sample from a Gaussian process prior with the covariance $R=VV^T$ and $V=[v_1, \ldots, v_m]^T$. The model has the form $$Y_{i,j} = T_{i,j} + \epsilon_{i,j}, T \sim N_{p,m}(T; 0, I_p, R).$$

From a matrix modeling point of view, GPLVM estimates the covariance between the rows and assume the columns to be conditionally independent.

A third model called Hierarchical Gaussian Process (HGP) is a multi-task learning model where each column of Y is a predictive function of one task, sampled from a Gaussian process prior, $$y_j = t_j + \epsilon_j, \; t_j \sim N_p(0, S),$$

where $\epsilon_j \sim N_p(0, \sigma^2 I_p)$. It introduces a hierarchical model where an inverse-Wishart prior is added for the covariance, $$Y_{i,j} = T_{i,j} + \epsilon_{i,j}, \; T \sim N_{p,m}(0, S, I_m), \; S \sim IW_p(\nu, \Sigma)$$

HGP utilizes the inverse-Wishart prior as the regularization and obtains a maximum a posteriori (MAP) estimate of S.

To predict unobserved elements in matrices, the structures of the matrices play an importance role, for example, the similarity between columns and between rows. Such structures imply that elements in a random matrix are no longer independent and identically-distributed (i.i.d.). Without the i.i.d. assumption, many machine learning models are not applicable.

SUMMARY

In one aspect, the system assumes that the entire matrix is a single sample drawn from a matrix-variate t distribution and suggests a matrix variate t model (MVTM) to predict those missing elements. MVTM generalizes a range of known probabilistic models, and automatically performs model selection to encourage sparse predictive models.

In another aspect, systems and methods predict missing elements from a partially-observed matrix by receiving one or more user item ratings; generating a model parameterized by matrices U, S, V; and outputting the model.

Advantages of the system may include one or more of the following. The system learns from a partially-observed random matrix and predicts its missing elements. The system provides an optimization method that sequentially minimizes a convex upper-bound of the log-likelihood, which is highly efficient and scalable. Predictions can be made without computing the mode or mean of the posterior distribution. These capabilities are achieved with a good predictive accuracy. An MVTM does not require the independence assumption over elements. The implicit model selection of the MVTM encourages sparse models with lower ranks. To minimize the log-likelihood with log-determinant terms, the system proposes an optimization method by sequentially minimizing its convex quadratic upper bound. The experiments show that the approach is accurate, efficient and scalable.

Useful properties of the model may include one or more of the following. First, MVTM continues the line of gradual generalizations across several known probabilistic models on random matrices, namely, from probabilistic principle component analysis (PPCA), to Gaussian process latent-variable models (GPLVMs), and to hierarchical Gaussian processes (HGPs). MVTMs can be further derived by analytically marginalizing out the hyper-parameters of these models. From a Bayesian modeling point of view, the marginalization of hyper-parameters means an automatic model selection and usually leads to a better generalization performance. The model selection by MVTMs explicitly encourages simpler predictive models that have lower ranks. Unlike the direct rank minimization, the log-determinant terms in the form of matrix-variate t prior offers a continuous optimization surface (though non-convex) for rank constraint; Third, like multivariate Gaussian distributions, a matrix-variate t prior is consistent under marginalization, that means, if a matrix follows a matrix-variate t distribution, its any sub-matrix follows a matrix-variate t distribution as well. This property allows to generalize distributions for finite matrices to infinite stochastic processes. Under a Gaussian noise model, the matrix-variate t distribution is not a conjugate prior. It is thus difficult to make predictions by computing the mode or mean of the posterior distribution. The system suggests an optimization method that sequentially minimizes a convex upper-bound of the log-likelihood, which is highly efficient and scalable. The system shows very good efficiency and excellent prediction accuracy.

BRIEF DESCRIPTION OF THE DRAWINGS

FIG. 5(a) shows an exemplary test matrix while FIG. 5(b) shows the matrix with added noise for testing purposes.

DESCRIPTION

The system models the random matrix of interest as a sample drawn from a matrix-variate t distribution, which is a generalization of Student-t distribution. The predictive model under such a prior is called the matrix-variate t model (MVTM).

Figure 1:
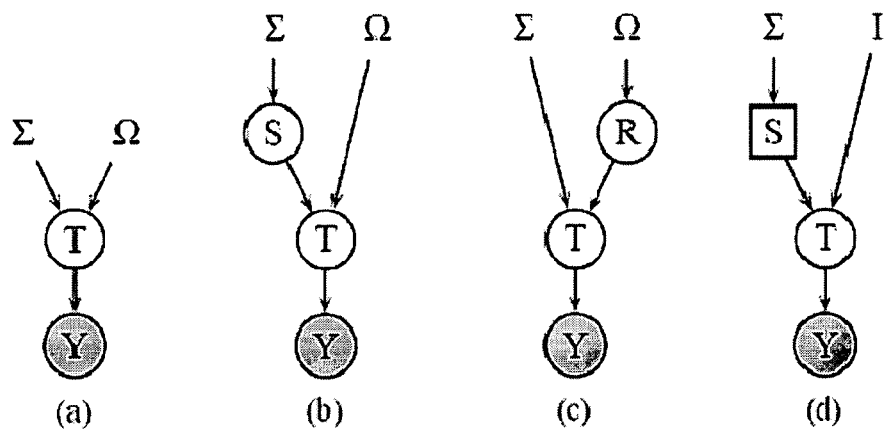
FIGS. 1(a)-(1d) show various exemplary models for matrix prediction.

FIG. 1(a)-(1d) show various exemplary models for matrix prediction. FIG. 1(a) shows an MVTM, while FIGS. 1(b) and (c) depict two normal-inverse-Wishard models, equivalent to MVTM when the covariance variable S (or R) is marginalized. FIG. 1(d) shows an HGP, which requires to optimize the covariance variable S. Circle nodes represent for random variables, shaded nodes for (partially) observable variables, text nodes for given parameters.

The PPCA models the row covariance of Y, the GPLVM models the column covariance, and the HGP assigns a hyper prior to prevent over-fitting when estimating the (row) covariance. From a matrix modeling point of view, capturing the dependence structure of Y by its row or column covariance is a matter of choices. The MVTMs provide a unified solution. From a Bayesian modeling viewpoint, as many variables should be marginalized as possible. The system thus extended the HGP model in two directions: (1) assume $T \sim N_{p,m}(0,S,\Omega)$ that have covariances on both sides of the matrix; (2) marginalize the covariance S on one side (see FIG. 1(b)). Then the system has a marginal distribution of T $$Pr(T) = \int N_{p,m}(T;0,S,\Omega) / W_p(S;v,\Sigma) dS = t_{p,m}(T;v-2p,0,\Sigma,\Omega),$$

which is a matrix-variate t distribution.

The matrix-variate t distribution of p×m matrix T is given by $$t_{p,m}(T; v, M, \Sigma, \Omega) = \frac{1}{Z}|\Sigma|^{-\frac{m}{2}}|\Omega|^{-\frac{p}{2}}|I_p + \Sigma^{-1}(T-M)\Omega^{-1}(T-M)^T|^{-\frac{v+m+p-1}{2}},$$

where v is the degree of freedom; M is a p×m matrix; $\Sigma$ and $\Omega$ are positive definite matrices of size p×p and m×m, respectively;

$$Z = (v\pi)^{\frac{mp}{2}} \Gamma_p\left(\frac{v+p-1}{2}\right) / \Gamma_p\left(\frac{v+m+p-1}{2}\right); \Gamma_p(\cdot)$$

is a multivariate gamma function, and $|\cdot|$ stands for determinant.

The model is depicted in FIG. 1(a). One property of matrix-variate t distribution is that the marginal distribution of its sub-matrix still follows a matrix-variate t distribution with the same degree of freedom. Therefore, the system can expand it to the infinite dimensional stochastic process. Eq. (1) shows that FIG. 1(a) and FIG. 1(b) describe two equivalent models. Comparing them with the HGP model represented in FIG. 1(d), the difference lies in whether S is point estimated or integrated out.

The same matrix-variate t distribution can be equivalently derived by putting another hierarchical generative process on the covariance R, as described in FIG. 1(c), where R follows an inverse-Wishart distribution. In other words, integrating the covariance on either side, the system obtains the same model. This implies that the model controls the complexity of the covariances on both sides of the matrix. Neither PPCA nor GPLVM has such a property.

The matrix-variate t distribution involves a determinant term of T, which becomes a log-determinant term in log-likelihood or KL-divergence. The log-determinant term encourages the scarcity of matrix T with lower rank. This property has been used as the heuristic for minimizing the rank of the matrix and Student's t priors have been applied to enforce sparse kernel machines.

Though the system can use evidence framework or other methods to estimate, the results are not good in many cases. Usually the system just sets this to a small number. Similar to v, the estimated $\sigma^2$ does not give the system a good result either, but cross-validation is a good choice. For the mean matrix M, the system just uses sample average for all observed elements. For many tasks, the system does not have any information about the $\Sigma$ or $\Omega$. Here, the system just sets them to $\sqrt{v}I_p$ and $\sqrt{v}I_m$ respectively, so that the variance of each elements of T in the prior distribution is about 1.

When the evaluation of the prediction is the sum of individual losses, the optimal prediction is to find the individual mode of the marginal posterior distribution, i.e., arg $\max_{T_{ij}} Pr(T_{ij}|Y_{||})$. However, there is no exact solution for the marginal posterior. The system has two ways to approximate the optimal prediction. One way to make prediction is to compute the mode of the joint posterior distribution of T, i.e. the prediction problem is $$\hat{T} = \underset{T}{\operatorname{argmax}} \{\ln Pr(Y_{||}|T) + \ln Pr(T)\}. \tag{2}$$

An alternative way is to use the individual mean of the posterior distribution to approximate the individual mode. Since the joint of individual mean happens to be the mean of the joint distribution, the system only need to compute the joint posterior distribution. The problem of prediction by means is written as $$\bar{T} = \mathbb{E}(T|Y_{||}). \tag{3}$$

However, it is usually difficult to compute the exact mean. One estimation method is the Monte Carlo method, which is computationally intensive. Discussion of an approximation to compute the mean is in Section 3.4. From the system's experiments, the prediction by means usually outperforms the prediction by modes.

The MVTM has a rich set of properties. Several are listed in the following Theorem.

Theorem 1. If $$q \begin{pmatrix} n & m \\ \Theta & \Phi \\ \Phi & T \end{pmatrix} \sim t_{p+q,m+n}\left(i, v, 0, \begin{pmatrix} q & p \\ \Sigma_0 & 0 \\ 0 & \Sigma \end{pmatrix}, \begin{pmatrix} n & m \\ \Omega_0 & 0 \\ 0 & \Omega \end{pmatrix}\right), \quad (4)$$

then $$Pr(T) = t_{p,m}(T; v, 0, \Sigma, \Omega), \quad (5)$$

$$Pr(T|\Theta, \Phi, \Psi) = t_{p,m}(T; v+q+n, M, (\Sigma+\Psi B\Psi^T), \\ (\Omega+\Phi^T A\Phi)), \quad (6)$$

$$Pr(\Theta) = t_{q,n}(\Theta; v, 0, \Sigma_0, \Omega_0), \quad (7)$$

$$Pr(\Phi|\Theta) = t_{q,m}((\Phi; v+n, 0, A^{-1}, \Omega), \quad (8)$$

$$Pr(\Psi|\Theta, \Phi) = t_{p,n}(\Psi; v+q, 0, \Sigma B^{-1}) = Pr(\Psi|\Theta), \quad (9)$$

$$\mathbb{E}(T, \Theta, \Phi, \Psi) = M, \quad (10)$$

$$Cov(vec(T^T)|\Theta, \Phi, \Psi) = (v+q+n-2)^{-1}(\Sigma + \Psi B\Psi^T)\hat{\times}(\Omega+\Phi^T A\Phi), \quad (11)$$

where $$A \stackrel{\text{def}}{=} (\Theta\Omega_0^{-1}\Theta^T + \Sigma_0)^{-1},$$

$$B \stackrel{\text{def}}{=} (\Theta^T\Sigma_0^{-1}\Theta + \Omega_0)^{-1},$$

$$M \stackrel{\text{def}}{=} \Psi\Omega_0^{-1}\Theta^T A\Phi = \Psi B\Theta^T\Sigma_0^{-1}\Phi.$$

This theorem provides some insights about MVTMs. The marginal distribution in Eq. (5) has the same form as the joint distribution; therefore the matrix-variate t distribution is extensible to an infinite dimensional stochastic process. As conditional distribution in Eq. (6) is still a matrix-variate t distribution, the system can use it to approximate the posterior distribution.

The system encounters log-determinant terms in computation of the mode or mean estimation. The following theorem provides a quadratic upper bounds for the log-determinant terms, which makes it possible to apply the optimization method discussed below.

Lemma 2. If X is a p×p positive definite matrix, it holds that ln |X|≦tr(X)−p. The equality holds when X is an orthonormal matrix.

Proof. Let $\{\lambda_1, \ldots, \lambda_p\}$ be the eigenvalues of X. We have ln $|X| = \Sigma_i \ln \lambda_i$ and $tr(X) = \Sigma_i \lambda_i$. Since $\ln \lambda_i \leq \lambda_i - 1$, we have the inequality. The equality holds when $\lambda_i = 1$. Therefore, when X is an orthonormal matrix (especially $X = I_p$), the equality holds.

Theorem 3. If Σ is a p×p positive definite matrix, Ω is an m×m positive definite matrix, and T and $T_0$ are p×m matrices, it holds that $$\ln|\Sigma + T\Omega^{-1}T^T| \leq h(T; T_0, \Sigma, \Omega) + h_0(T_0, \Sigma, \Omega),$$

where $$h(T; T_0, \Sigma, \Omega) \stackrel{\text{def}}{=} tr((\Sigma + T_0\Omega^{-1}T_0^T)^{-1}T\Omega^{-1}T^T),$$

$$h_0(T_0, \Sigma, \Omega) \stackrel{\text{def}}{=} \ln|\Sigma + T_0\Omega^{-1}T_0^T| + tr((\Sigma + T_0\Omega^{-1}T_0^T)^{-1}\Sigma^{-1}) - p$$

The equality holds when $T = T_0$. Also it holds that $$\frac{\partial}{\partial T}h(T; T_0, \Sigma, \Omega)\bigg|_{T=T_0} =$$

$$2(\Sigma + T_0\Omega^{-1}T_0^T)^{-1}T_0\Omega^{-1} = \frac{\partial}{\partial T}\ln|\Sigma + T\Omega^{-1}T^T|\bigg|_{T=T_0}$$

Applying Lemma 2 with $X = (\Sigma + T_0\Omega^{-1}T_0^T)^{-1}(\Sigma + T\Omega^{-1}T^T)$, the system obtains the inequality. By some calculus the system has the equality of the first-order derivative. Actually h(·) is a quadratic convex function with respect to T, as $(\Sigma + T_0\Omega^{-1}T_0^T)^{-1}$ and $\Omega^{-1}$ are positive definite matrices.

An exemplary optimization method is discussed next. Once the objective is given, the prediction becomes an optimization problem. The system uses an EM style optimization method to make the prediction. Suppose J(T) be the objective function to be minimized. If the system can find an auxiliary function, Q(T;T'), having the following properties, the system can apply this method.
1. J(T)≦Q(T; T') and J(T')=Q(T'; T'),
2. $\partial J((T)/\partial T|_{T=T'} = \partial Q(T; T')/\partial T|_{T=T'}$,
3. For a fixed T', Q(T; T') is a quadratic and convex with respect to T.

Starting from any $T_0$, as long as the system can find a $T_1$ such that $Q(T_1, T_0) < Q(T_0, T_0)$, the system has $J(T_0) = Q(T_0, T_0) > Q(T_1, T_0) \geq J(T_1)$. If there exists a global minimum point of J(T), there exists a global minimum point of $Q(T; T_0)$ as well, because $Q(T; T_0)$ is upper bound of J(T). Since $Q(T; T_0)$ is quadratic with the respect to T, the system can apply the Newton-Raphson method to minimize $Q(T; T_0)$. As long as $T_0$ is not a local minimum, maximum or saddle point of J, the system can find a T to reduce $Q(T; T_0)$, because $Q(T; T_0)$ has the same derivative as J(T) at $T_0$. Usually, a random starting point, $T_0$ is unlikely to be a local maximum, then $T_1$ cannot be a local maximum. If $T_0$ is a local maximum, the system can reselect a point, which is not. After the system finds a $T_i$, the system repeats the procedure to find a $T_{i+1}$ so that $J(T_{i+1}) < J(T_i)$, unless $T_i$ is a local minimum or saddle point of J. Repeating this procedure, $T_i$ converges a local minimum or saddle point of 3, as long as $T_0$ is not a local maximum.

Next, exemplary predictions by modes are discussed. Following Eq. (2), the goal is to minimize the objective function $$\hat{J}(T) \stackrel{\text{def}}{=} l(T) + \frac{v+m+p-1}{2}\ln\left|I_p + \frac{1}{v}TT^T\right|, \text{ where}$$

$$l(T) \stackrel{\text{def}}{=} \frac{1}{2\sigma^2}\Sigma_{(i,j)\in II}(T_{ij} - Y_{ij})^2 \stackrel{c}{=} -\ln Pr(Y_I)$$

where $\underline{\underline{c}}$ denotes equivalence by ignoring irrelevant terms (or constants).

To minimize $\hat{J}$, the system introduces an auxiliary function, $$Q(T;T') \stackrel{\text{def}}{=} l(T) + h(T;T',\Sigma,\Omega) + h_0(T',\Sigma,\Omega). \quad (13)$$

By Corollary 3, the system has that $\hat{J}(T) \leq Q(T; T')$, $\hat{J}(T') = Q(T', T')$, and Q(T, T') has the same first-order derivative as $\hat{J}(T)$ at T'. Because l and h are quadratic and convex, Q is quadratic and convex as well. Therefore, the system can apply the optimization method in Section 3.2 to minimize $\hat{J}$.

However, when the size of T is large, to find $\hat{T}$ is still time consuming and requires a very large space. In many tasks, the system only needs to infer a small portion of $\hat{T}$. Therefore, the system considers a low rank approximation, using $UV^T$ to approximate T, where U is a p×k matrix and V is an m×k matrix. The problem of Eq. (2) is approximated by $\operatorname{argmin}_{U,V} \hat{J}(UV^T)$. The system can minimize $J_1$ by alternatively optimizing U and V. The system can put the final result in a canonical format as $\hat{T} \approx USV^T$, where U and V are semi-orthonormal and S is a k×k diagonal matrix. This result can be consider as the SVD of an incomplete matrix using matrix-variate t regularization. The details are skipped because of the limit space.

The prediction by means will be discussed next. As the difficulty in explicitly computing the posterior distribution of T, the system takes a variational approach to approximate its posterior distribution by a matrix-variate t distribution via an expanded model. The system expands the model by adding $\Theta$, $\Phi$ and $\Psi$ with distribution as Eq. (4), with $\Sigma_0 = I_q$ and $\Omega_0 = I_n$. Since the marginal distribution, Eq. (5), is the same as the prior of T, the system can derive the original model by marginalizing out v, $\Phi$ and $\Psi$. However, instead of integrating out $\Theta$, $\Phi$ and $\Psi$, the system uses them as the parameters to approximate T's posterior distribution. Therefore, the estimation of the parameters is to minimize $$-\ln Pr(\Theta, \Phi, \Psi) - \ln \int Pr(T|\Theta, \Phi, \Psi) Pr(Y_{II}|T) dT \quad (14)$$

over $\Theta$, $\Phi$ and $\Psi$. The first term of Eq. (14) can be written as $$\begin{aligned}
-\ln Pr(\Theta, \Phi, \Psi) &= -\ln Pr(\Theta) - \\
\ln Pr(\Phi|\Theta) - \ln Pr(\Psi|\Theta, \Phi) &\stackrel{c}{=} \frac{v+q+n+p+m-1}{2} \ln|I_q + \Theta\Theta^T| + \\
&\frac{v+q+n+m-1}{2} \ln|I_m + \Omega^{-1}\Phi^T A \Phi| + \\
&\frac{v+q+n+p-1}{2} \ln|I_p + \Sigma^{-1}\Psi B \Psi^T|.
\end{aligned} \quad (15)$$

Because of the convexity of negative logarithm, the second term of Eq. (14) is bounded by $$-\int Pr(T|\Theta, \Phi, \Psi) Pr(Y_{II}|T) dT \stackrel{c}{\leq} l\left(\Psi B^{\frac{1}{2}} \Theta^T A^{\frac{1}{2}} \Phi\right) + \frac{1}{2\sigma^2(v+q+n-2)} \sum_{(i,j) \in II} (\Sigma_{ii} + \Psi_i B[\Psi_i]^T)(\Omega_{jj} + [\Phi_{\cdot j}]^T A \Phi_{\cdot j}), \quad (16)$$

because $-\ln Pr(Y_{II}|T)$ is quadratic respective to T, thus the system only need integration using the mean and variance of $T_{ij}$ of $Pr(T|\Theta, \Phi, \Psi)$, which is given by Eq. (10) and (11). The parameter estimation not only reduce the loss (the term of $l(\cdot)$), but also reduce the variance. Because of this, the prediction by means usually outperforms the prediction by modes.

$$T = M = USV^T.$$

Let J be the sum of the right-hand-side of Eq. (15) and (16), which can be considered as the upper bound of Eq. (14) (ignoring constants). Here, the system estimates the parameters by minimizing J. Because A and B involve the inverse of quadratic term of $\Theta$, it is awkward to directly optimize $\Theta$, $\Phi$ and $\Psi$. The system reparameterizes J by $U \stackrel{\text{def}}{=} \Psi B1/2$, $V \stackrel{\text{def}}{=} \Phi^T A1/2$, and $S \stackrel{\text{def}}{=} \Theta$. The system can easily apply the optimization method in Section 3.2 to find optimal U, V and S. After estimation U, V and S, by Theorem 1, the system can compute $T = M = USV^T$.

Figure 2:
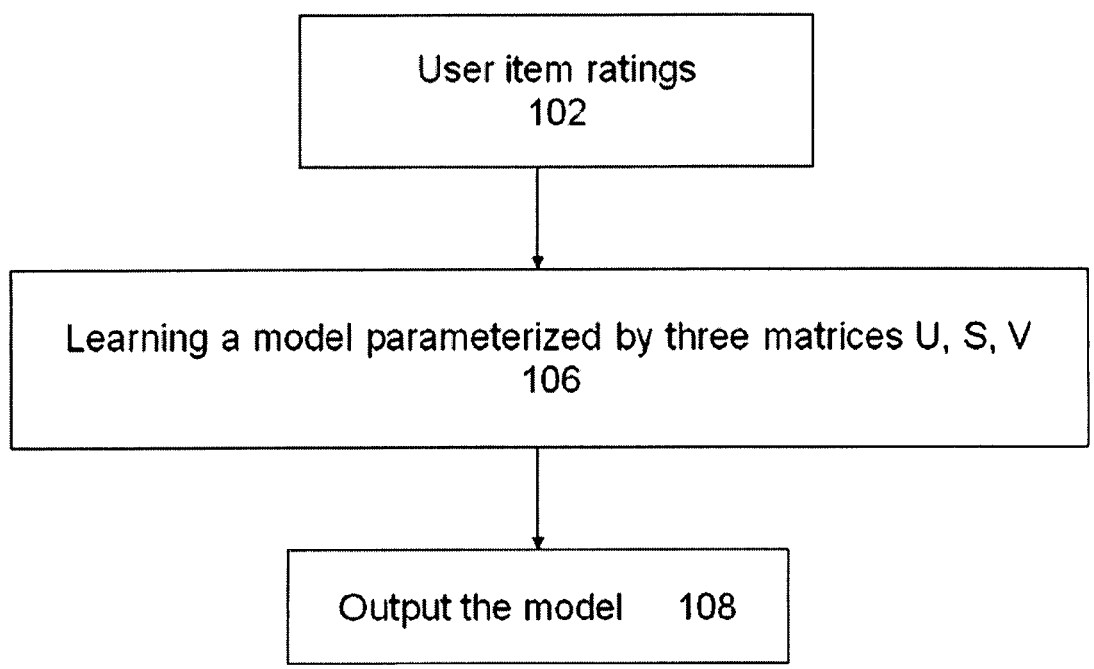
FIG. 2 shows an exemplary learning process.
Figure 3:
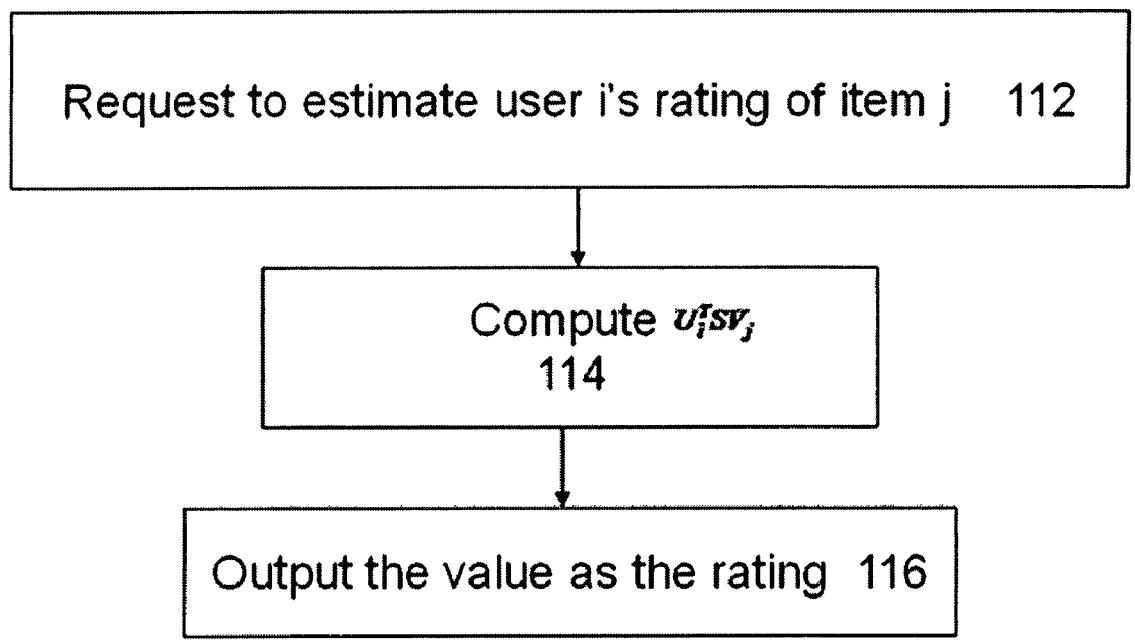
FIG. 3 shows an exemplary run-time process.
Figure 4:
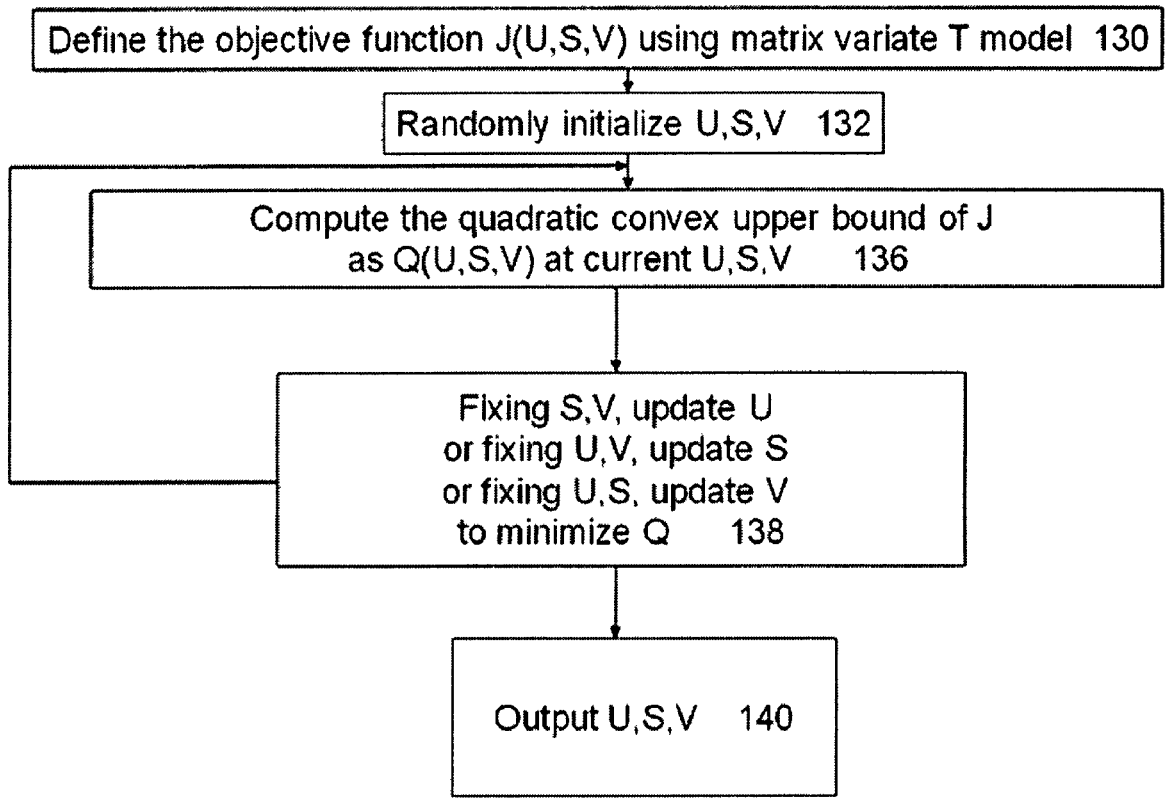
FIG. 4 shows in more detail a model parameter learning process used in the process of FIG. 2.

The foregoing analysis are performed on a computer using exemplary processes shown in FIGS. 2-4. FIG. 2 shows an exemplary learning process. First, the process collects one or more user item ratings (102). Next, the system trains a model that is parameterized by three matrices U, S and V (106). More details on the training or teaching operation 106 are shown in FIG. 4. The model is then generated for predicting missing elements or for other uses (108).

FIG. 3 shows an exemplary run-time process. The process of FIG. 3 requests each user I to rate each item j (112). The matrix value $U_i^T S V_j$ is then determined (114). The determined value is output as a rating (116).

FIG. 4 shows in more detail a model parameter learning process used in the process of FIG. 2. First the process defines an objective function J(U, S, V) using the matrix variate T model (130). Next, the process initializes U, S, and V with random values (132). The process then computes the quadratic convex upper bound of J as Q(U,S,V) for the current U, S, and V values (146). The process then fixes two of the three variables and updates the remaining variable to minimize Q (138). The resulting U, S, and V values are provided as outputs (140).

In one embodiment, Maximum Margin Matrix Factorization (MMMF) can be used to perform mode estimation. Using trace norm on the matrix as regularization, MMMF overcomes the over-fitting problem in factorizing matrix with missing values. From the regularization viewpoint, the prediction by mode of MVTM uses log-determinants as the regularization term in Eq. (12). The log-determinants encourage sparsity predictive models.

In another embodiment, Stochastic Relational Models (SRMs) can be used. SRMs extend HGPs by estimating the covariance matrices for each side. The covariance functions are required to be estimated from observation. By maximizing marginalized likelihood, the estimated S and R reflect the information of the dependency structure. Then the relationship can be predicted with S and R. During estimating S and R, inverse-Wishart priors with parameter $\Sigma$ and $\Omega$ are imposed to S and R respectively. MVTM differs from SRM in integrating out the hyper-parameters or maximizing out.

In yet another embodiment, Robust Probabilistic Projections (RPP) can be used which applies Student-t distribution to extends PPCA by scaling each feature vector by an independent random variable. Written in a matrix format, RPP is $$T \sim N_{p,m}(T; \mu 1^T, WW^T, U), \ U = \operatorname{diag}(u_i), \ u_i \sim IG\left(u_i \Big| \frac{v}{2}, \frac{v}{2}\right),$$

where IG is inverse Gamma distribution. Though RPP unties the scale factors between feature vectors, which could make the estimation more robust, it does not integrate out the covariance matrix, which the system did in MVTM. Moreover inherited from PPCA, RPP implicitly uses independence assumption of feature vectors. Also RPP results different models depending on which side the system assumes to be independent, therefore it is not suitable for matrix prediction.

Figure 5:
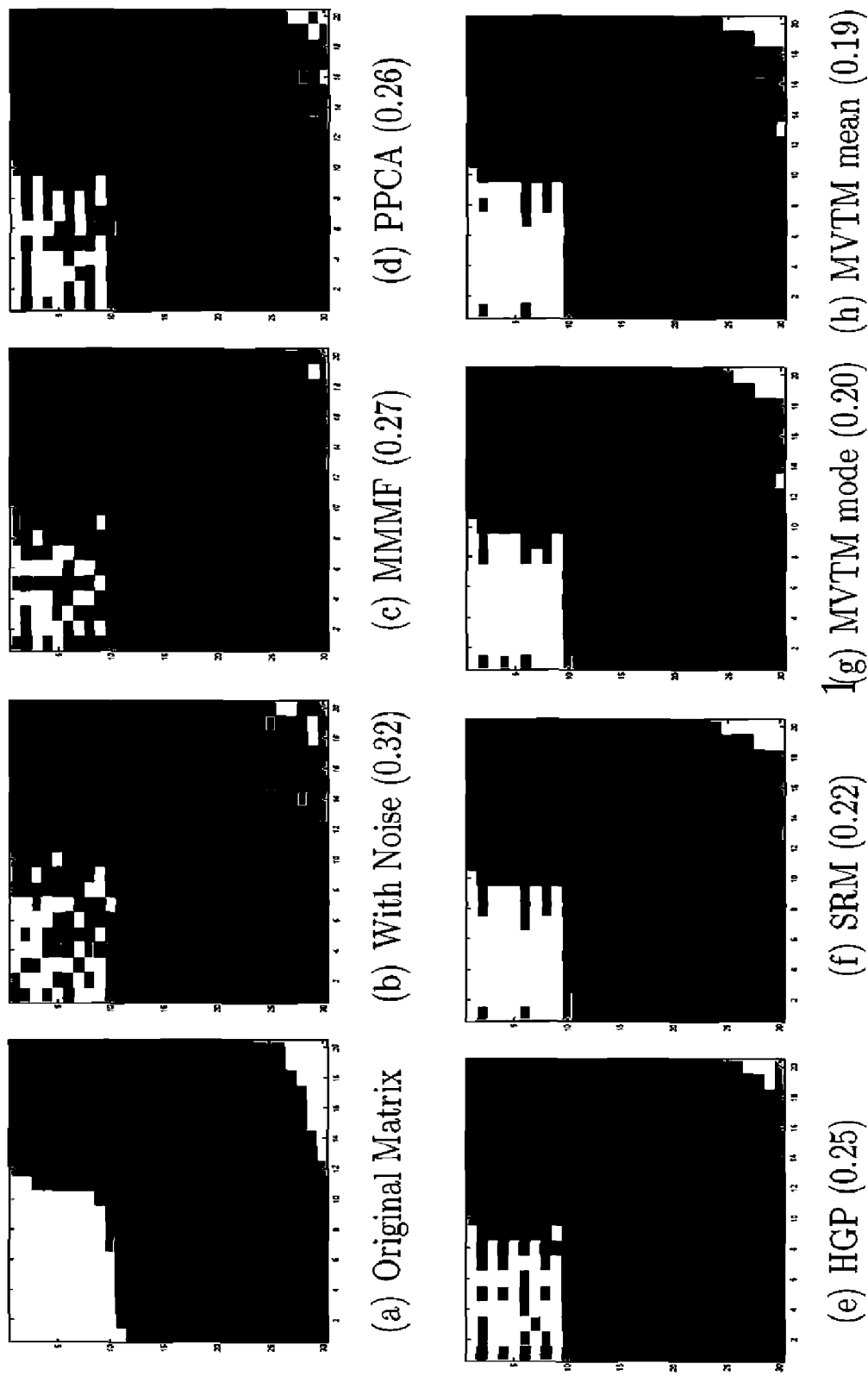

In a test, the system generates a 30×20 matrix (FIG. 5(a)), then add noise with $\sigma^2 = 0.1$ (FIG. 5(b)). The root mean squared noise is 0.32. The system selects 70% elements as the observed data and the rest elements are for prediction. The system applies MMMF, PPCA, HGP, SRM and MVTM prediction-by-means and prediction by-modes methods. The number of dimensions for low rank approximation is 10. The reconstruction matrix and root mean squared errors of prediction on the unobserved elements (comparing to the original matrix) are shown in FIG. 5(c)-5(h), respectively.

Figure 6:
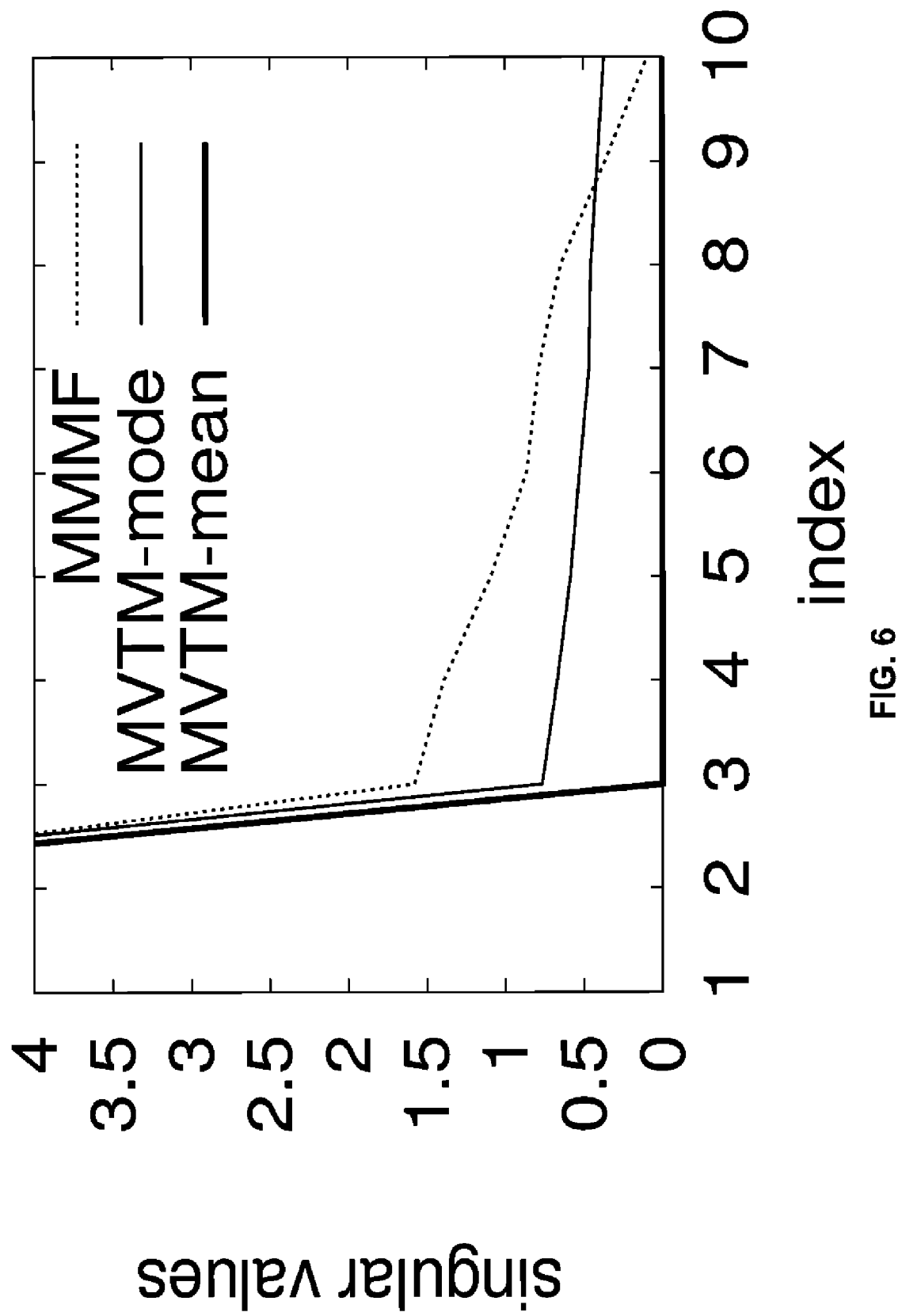
FIG. 6 is a chart illustrating exemplary singular values of recovered matrices in descending order.

MVTM is in favor of sparse predictive models. To verify this, the system depicts the singular values of the MMMF method and two MVTM prediction methods in FIG. 6. There are only two singular values of the MVTM prediction-by-means method are non-zeros.

The singular values of the mode estimation decrease faster than the MMMF ones at beginning, but decrease slower after a threshold. This confirms that the log-determinants automatically determine the intrinsic rank of the matrices.

In another test using Eachmovie data, the system tests the algorithms on Eachmovie from Breese, et al. "Emperical analysis of predictive algorithms for collaborative filtering" in UAI-98, pp 43-52 (1998). The dataset contains 74,424 users' 2,811,718 ratings on 1,648 movies, i.e. about 2.29% are rated by zero-to-five stars. The system puts all ratings into a matrix, and randomly select 80% as observed data to predict the remaining ratings. The random selection was carried out 10 times independently. The system compares the system's approach with other three approaches: 1) USER MEAN predicting rating by the sample mean of the same user' ratings; 2) MOVIE MEAN, predicting rating by the sample mean of users' ratings of the same movie; 3) MMMF[8]; 4) PPCA. The system does not have a scalable implementation for other approaches compared in the previous experiment. The number of dimensions is 10. The results are shown in Table 1 which shows that the two MVTM prediction methods outperform the other methods.

TABLE 1

RMSE (root mean squred error) and MAE (mean absolute error) of experiments on Each-movie data. All standard errors are 0.001 or less.

|  | user mean | movie mean | MMMF | PPCA | MVTM (mode) | MVTM (mean) |
|---|---|---|---|---|---|---|
| RMSE | 1.425 | 1.387 | 1.186 | 1.165 | 1.162 | 1.151 |
| MAE | 1.141 | 1.103 | 0.943 | 0.915 | 0.898 | 0.887 |

In summary, the matrix-variate t models for matrix prediction system models the entire matrix as a sample drawn from a matrix-variate t distribution. An MVTM does not require the independence assumption over elements. The implicit model selection of the MVTM encourages sparse models with lower ranks. To minimize the log-likelihood with log-determinant terms, the system proposes an optimization method by sequentially minimizing its convex quadratic upper bound. The experiments show that the approach is accurate, efficient and scalable in learning from a partially-observed random matrix and predict its missing elements. The system assumes that the entire matrix is a single sample drawn from a matrix-variate t distribution and suggests the MVTM to predict those missing elements. The system shows that MVTM generalizes a range of known probabilistic models, and automatically performs model selection to encourage sparse predictive models. Due to the non-conjugacy of its prior, it is difficult to make predictions by computing the mode or mean of the posterior distribution. The system suggests an optimization method that sequentially minimizes a convex upper-bound of the log-likelihood, which is very efficient and scalable. The experiments on a toy data and EachMovie dataset show a good predictive accuracy of the model.

Exemplary applications for the above system can include one or more of the following sample applications. On such application is personalized recommendation (e.g. book recommendation at a web retailer such as Amazon.com). The method recommends items according to value of the score matrix, whose axes are customers and items. This application is unlike the conventional recommendation system which is based only on previously purchased items by the customer. Another application is link detection in a social network. In this exemplar application, known links are entered into a matrix where both axes are persons. The method can compute the score of unknown pair of persons. By the score, the system can predict the possibility of unknown links.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer-implemented method to predict one or more missing elements from a partially observed matrix, comprising:
   a. receiving one or more user item ratings;
   b. generating a model parameterized by matrices U, S, V;
   c. applying the model to display an item based on one or more predicted missing elements;
   d. applying the model at run-time and determining the matrix value $U^T_i$, S, $V_j$, which is output as a rating.

2. The method of claim 1, wherein the generating the model comprises:

a. defining an object function J(U, S, V) using a matrix variate T model;
b. initializing U, S, V;
c. determining a quadratic convex upper bound of J as Q(U, S, V);
d. fixing two of U, S, V and updating the remaining variable to minimize Q; and
e. outputting U, S, V.

3. The method of claim 1, comprising applying the model at run-time and requesting a user to rate one or more items.

4. The method of claim 1, comprising generating a rating.

5. The method of claim 1, wherein the model comprises a predictive matrix-variate t model.

6. The method of claim 1, comprising predicting missing elements from the generated model.

7. The method of claim 6, wherein the predicting elements uses an EM-style optimization method.

8. The method of claim 6, wherein the predicting elements uses an optimization method that sequentially minimizes a convex upper-bound of the log-likelihood.

9. The method of claim 6, comprising predicting by modes.

10. The method of claim 6, comprising predicting by means.

11. A computer-implemented method to predict missing elements from a partially-observed matrix, comprising:
treating the matrix as a single sample drawn from a matrix-variate t distribution;
using a matrix variate t model (MVTM) to predict the missing elements;
displaying an item based on one or more predicted missing elements; and
applying the matrix variate t model at run-time and determining the matrix value $U^T_i$, S, $V_i$, which is output as a rating.

12. The method of claim 11, wherein the MVTM generalizes a range of known probabilistic models.

13. The method of claim 11, comprising automatically performing model selection to encourage sparse predictive models.

14. The method of claim 11, comprising predicting missing elements from the matrix variate t model.

15. The method of claim 14, wherein the predicting elements uses an optimization method that sequentially minimizes a convex upper-bound of the log-likelihood.

16. The method of claim 1, comprising applying Maximum Margin Matrix Factorization (MMMF) to perform mode estimation.

17. The method of claim 1, comprising applying Stochastic Relational Models (SRMs) to estimate a covariance matrix.

18. The method of claim 1, comprising applying collaborative filtering to predict missing elements in the matrix.

* * * * *